United States Patent
Kanakubo

(10) Patent No.: US 7,158,519 B2
(45) Date of Patent: Jan. 2, 2007

(54) PACKET TRANSFER APPARATUS, TRANSFER INFORMATION MANAGEMENT METHOD USED THERFOR AND TRANSFER INFORMATION SEARCH METHOD THEREOF

(75) Inventor: Katsuya Kanakubo, Tokyo (JP)

(73) Assignee: NEC Corporation, Tokyo (JP)

( * ) Notice: Subject to any disclaimer, the term of this patent is extended or adjusted under 35 U.S.C. 154(b) by 888 days.

(21) Appl. No.: 10/003,309

(22) Filed: Dec. 6, 2001

(65) Prior Publication Data

US 2002/0067722 A1 Jun. 6, 2002

(30) Foreign Application Priority Data

Dec. 6, 2000 (JP) .............................. 2000-370837

(51) Int. Cl.
*H04L 12/28* (2006.01)
(52) U.S. Cl. ............. 370/392; 370/395.31; 370/395.32
(58) Field of Classification Search ........ 370/229–235, 370/351, 389, 392, 395.31, 395.32, 400, 370/412, 475
See application file for complete search history.

(56) References Cited

U.S. PATENT DOCUMENTS

| 6,674,756 B1 * | 1/2004 | Rao et al. ............... 370/395.21 |
| 6,748,484 B1 * | 6/2004 | Henderson et al. ......... 711/108 |
| 6,775,269 B1 * | 8/2004 | Kaczmarczyk et al. ..... 370/352 |

* cited by examiner

*Primary Examiner*—Huy D. Vu
*Assistant Examiner*—Jason Mattis
(74) *Attorney, Agent, or Firm*—Young & Thompson

(57) ABSTRACT

To provide a packet transfer apparatus capable of making a competition problem among entries avoidable, reducing entry management costs and improving entry setting processing ability. If an IP packet is inputted, a search process circuit sends packet search information and performs a search of a CAM of a packet search table. In the search of the CAM of the packet search table, a registration position of the entry that was hit is outputted. Address information of each table in which transfer information is set is obtained from a transfer information address table, and the transfer information is read from a policer information table, an application transfer information table, an in-system common transfer information table and an output information table based on the address information respectively.

23 Claims, 15 Drawing Sheets

PACKET TRANSFER APPARATUS, TRANSFER INFORMATION MANAGEMENT METHOD USED THERFOR AND TRANSFER INFORMATION SEARCH METHOD THEREOF

BACKGROUND OF THE INVENTION

1. Field of the Invention

The present invention relates to a packet transfer apparatus, a transfer information management method used therefor and a transfer information search method thereof, in particular, to QoS (Quality of Service) assurance in IP (Internet Protocol) packet transfer.

2. Description of the Related Art

Until now, as for IP packet transfer, a Best Effort (BE) transfer not assuring a communication transmission zone available to a user during congestion of a network is general. As for the IP packet transfer assuring the communication transmission zone during congestion of the network, however, it is discussed how to give QoS assurance thereof when providing the QoS having transmission delay, fluctuation, minimum guaranteed speed, a peak value and so on as parameters.

The factors of this QoS technology can be largely divided into the three of "Classify" for identifying the flow/class of a packet based on packet information, "Policing" for performing admission control of the packet identified by the "Classify" of the flow, and "Forwarding" for determining how to transfer the packet identified by the "Classify."

The "Classify" is a high-speed search based on a plurality of pieces of information (keys), the "Policing" is a determinant of admission control [forced disposal, inflow rate measurement, CC (Central Control Equipment) activity ratio measurement and soon], and the "Forwarding" is a cuing algorithm, load-balancing, a high-speed alternative and so on.

As for the above "Classify," there is a flow identification search method in IP packet transfer. This flow identification search method uses a memory capable of high-speed search called a CAM (Content-Addressable Memory) 12 as shown in FIG. 16.

A search pattern entry (hereafter, referred to as the entry) that is hit is written to the CAM 12 in advance, and if the IP packet arrives, a search process circuit 11 inputs that search information to the CAM 12. If the search process circuit 11 obtains a registration position (address information) of the entry that was hit by a search of the CAM 12 with that search information, it reads action solution information from the entry of the action solution memory 13 based on that registration position so as to solve packet action based on that action solution information.

Here, as a source IP address, a destination IP address, DSPC, TCP (Transmission Control Protocol)/UDP (User Datagram Protocol) and so on are registered in registration of search keys with CAM 12, the source IP address, a destination IP address, DSPC, TCP/UDP and so on are also given as packet search information.

In hardware, the above series of operations solve packet transfer information. What is important here is the above registration of search keys with the CAM 12 and a search process for the CAM 12. As the CAM 12 is searched from a high order entry to adopt a first hit entry according to its limitation in the above series of operations, registration order of entries is very important. Accordingly, if the CAM 12 is to be searched once, it is necessary to write the entries of important functions as high order entries.

The current hardware functionally performs two searches ("a search for a QoS flow entry" and "a search for a routing entry") in the search process for the CAM 12, and the registration of the search keys is performed by software. A difference between the two searches is that "the search for a QoS flow entry" is to search with a plurality of pieces of key information (the source IP address and the destination IP address, for instance) whereas "the search for a routing entry" is to search only with the destination IP address.

In addition, a functional difference between the two searches is that "the search for a QoS flow entry" is intended to solve QoS information of a matching packet whereas "the search for a routing entry" is intended to solve a destination (output destination).

As for the above-mentioned technology in the past, the CAM is used in order to implement a high-speed search in the "Classify" and the entries to be registered with the CAM are very important to the registration order, and another important point is how efficiently the process can be executed in updating the entries. As for the current entry management, control of the registration order is complicated and limited in many ways, and an efficient update method of the entries is not implemented yet.

While forced disposal (filtering) and inflow rate checks (disposal, class change) are currently performed in the "Policing," control according to a system state (determination of admission control by a CC activity ratio and so on) is not performed. In case of considering an IP-Switch for a carrier that is seriously influenced by a system down, such a function seems to be necessary.

As for the "Forwarding," it is required to update a plurality of points in the Forwarding information update process, and there is a problem in processing ability. In addition, in an action determination method depending on an application such as output line determination, an output line and other actions are directly determined from the "Classify," so that it is not a configuration to flexibly support an output line state and the application.

In addition, while the QoS technology gives an image of a matter related to transfer, it is also an important factor in reality to collect packet statistical information transferred by the QoS technology and let a user know exact information on whether the QoS that is set is assured.

That is, in packet filtering wherein it is determined whether to permit or deny the packet matching with the entry, there is a first problem, as it is the same search as a QoS transfer entry search, that the setting becomes very complicated or limitation arises to the function due to another QoS transfer entry in the case where a certain entry is to be permitted. Moreover, there is a second problem, as it is a precondition in the entry management to register the packet to be transferred without fail, that an arbitrary packet accounting function cannot be provided.

Here, the above problem will be described by referring to FIG. 17. In the case of the first problem, if a maintainer is to permit a source IP address "10.40.*.*" and abandon a source IP address "10.*.*.*," that function can be provided by setting a logical image as shown in FIG. 17A.

However, if it requires a setting of the QoS transfer to the packets of the source IP addresses "10.40.22.*" and "10.42.68.*," it must be set as shown in FIG. 17B in order to keep the above entry function effective.

In addition, if the setting of abandoning a source IP address "10.*.*.*" is deleted thereafter, a rewrite of an entry registration position as shown in FIG. 17C arises in order to keep each entry effective.

In case of managing several tens of thousands of entries of such cases, increase in update time of entry rewriting is caused in addition to complicatedness of management. Accordingly, it is difficult in reality to perform the search of a filter function and the search of the QoS transfer concurrently.

On the other hand, in the case of the second problem, the maintainer can only monitor statistical information of the entries currently registered with the CAM when monitoring traffic. For instance, in the case where the entries as shown in FIG. 17D are currently registered, if the maintainer wants to know the statistical information of the source IP address "10.40. *. *," the information is available by totaling the counter values added to the entries.

When the entries as shown in FIG. 17E are set in the case where the maintainer further wants to know the statistical information of the source IP address "10.40.22.4," however, transfer information must also be set in order to keep the original entries effective, even though the entries are only intended to give the counter information.

If the second entry (the entry of the source IP address "10.40.22.*") is deleted in this state, the transfer information of the first entry only for the purpose of an account must also be updated. In the case of several tens of thousands of entries, it is very difficult in reality to execute these processes as with the above first problem.

SUMMARY OF THE INVENTION

Thus, an object of the present invention is to provide a packet transfer apparatus capable of solving the above problems, avoiding a competition problem among entries, reduction of entry management costs and improvement in entry setting processing ability, a transfer information management method used therefor and a transfer information search method thereof.

The packet transfer apparatus of the present invention is a data transfer apparatus for transferring a packet based on transfer information corresponding to one of a plurality of entries set in a packet search table in advance, and has a plurality of registration tables for having the above described transfer information registered by objectives; an address table for having an address of each of the above described plurality of registration tables registered; and search means for obtaining the above described address from the above described address table corresponding to a matching entry of the above described plurality of entries, and obtaining transfer information on each of the above described plurality of registration tables based on that address.

The packet transfer information management method of the present invention is that of the data transfer apparatus for transferring the packet based on transfer information corresponding to one of the plurality of entries set in the packet search table in advance, wherein management is conducted by registering the above described transfer information in the plurality of registration tables by objectives; and registering the address of each of the above described plurality of registration tables in the address table so as to obtain the transfer information on each of the above described plurality of registration tables based on the address of the above described address table corresponding to the matching entry of the above described plurality of entries.

The packet transfer information search method of the present invention is that of the data transfer apparatus for transferring the packet based on the transfer information corresponding to one of the plurality of entries set in the packet search table in advance, and has the steps of obtaining the address corresponding to the matching entry of the above described plurality of entries from the address table for having the address of each of the plurality of registration tables with the above described transfer information registered by objectives; and obtaining the transfer information on each of the above described plurality of registration tables based on that address.

That is to say, the packet transfer apparatus of the present invention provides a table configuration to be used for packet transfer for implementing the packet transfer flexibly supporting an application in an IP packet transfer, a management method and a usage thereof.

To be more specific, as for the table configuration of the packet transfer of the present invention, it has a configuration wherein the addresses of the tables of transfer information managed by objectives as search results of an inputted packet is obtained so as to indirectly obtain the transfer information. Taking such a configuration allows memory reduction by sharing information, a faster transfer information update process, and packet transfer flexibly supporting the application.

In addition, it is possible for the management method and the usage of the packet search table of the present invention to solve the problem remaining so far that, of the existing entries and the entries of different functions to be added from now on, only the functions of the entries positioned in high order become effective and also to simplify the packet search entry management by classifying the entries to be set in the packet search table into a plurality of types and executing a packet search process on actual receipt of the packet a plurality of times.

To be more specific, the packet transfer apparatus of the present invention provides search entries wherein received packets are classified into plurality of types and the search processes for the entries are classified by functions, and also the transfer information obtained as the search results is divided by the objectives so as to share the transfer information by indirect referencing.

The competition problem among the entries is avoided by performing the search process independently by the functions, so that it becomes possible to reduce entry management costs of the maintainer and improve throughput by omitting a competition check among the entries in an entry setting process.

In addition, as a result of dividing the transfer information obtained as the search results by the objectives, it is possible, when changing the application, to provide it with minimum necessary change in changing a transfer process determination table by making no change to an application-independent portion (cross system portion).

Moreover, as it is possible, by sharing the transfer information obtained as the search results, to handle the update of the transfer information by updating one table, the throughput is improved. Furthermore, it leads to improvement in reliability of a network if considered in collaboration with an alternative function.

DETAILED DESCRIPTION OF THE PREFERRED EMBODIMENTS

Figure 1:
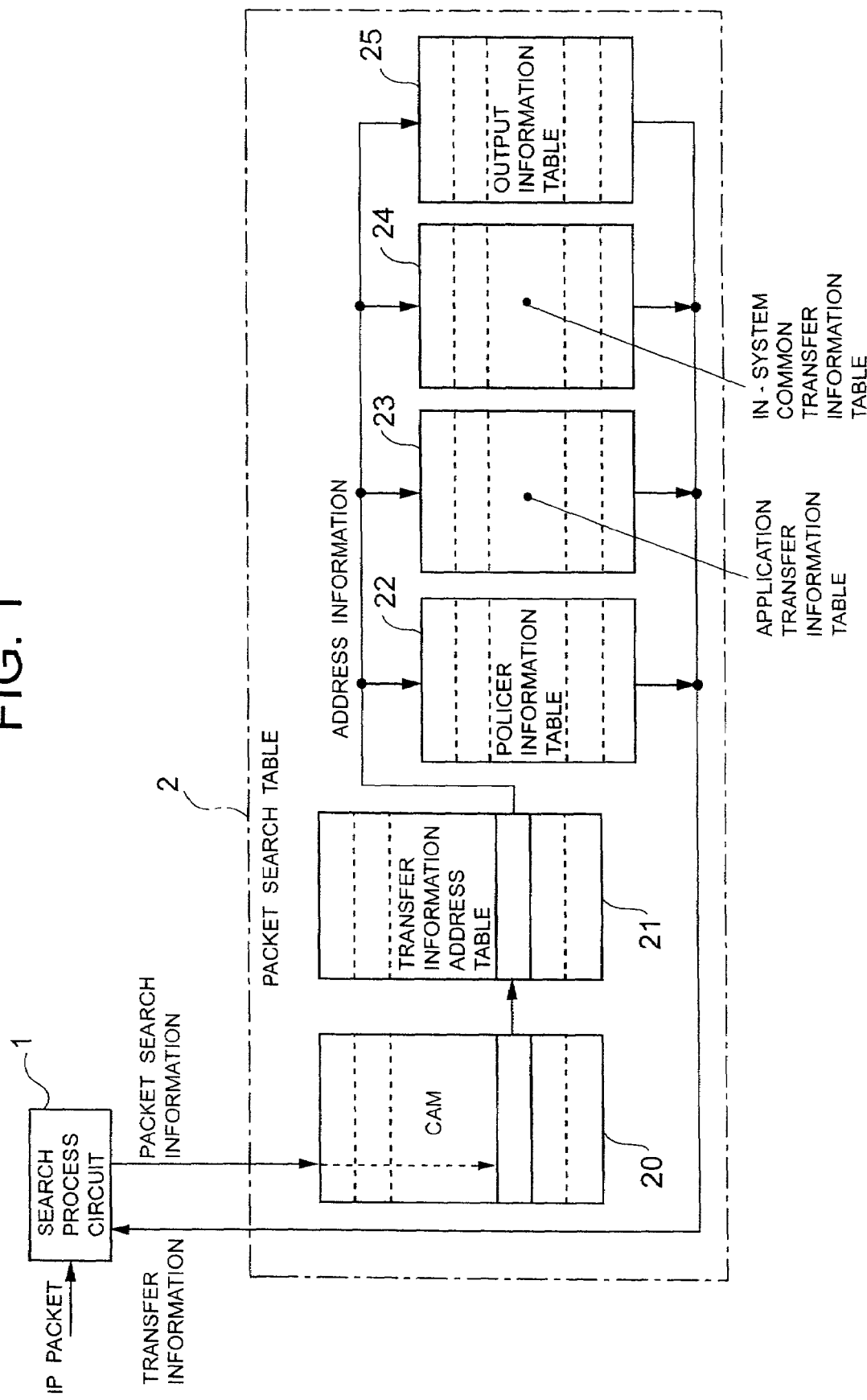
FIG. 1 is a block diagram for showing a configuration of a transfer information search division of a packet transfer apparatus according to an embodiment of the present invention.

Next, an embodiment of the present invention will be described by referring to the drawings. FIG. 1 is a block diagram for showing a configuration of a transfer information search division of a packet transfer apparatus according to an embodiment of the present invention. In FIG. 1, the transfer information search division of the packet transfer apparatus is comprised of a search process circuit 1 and a packet search table 2.

The packet search table 2 is comprised of a CAM (Content-Addressable Memory) 20, a transfer information address table 21, a policer information table 22, an application transfer information table 23, an in-system common transfer information table 24 and an output information table 25.

If an IP packet is inputted, the search process circuit 1 performs a search of the packet search table 2 with the CAM 20 by sending packet search information to the packet search table 2. A search pattern entry (hereafter, referred to as the entry) that was hit is written to the CAM 20 in advance, and a registration position (address information) of the entry that was hit was outputted to the transfer information address table 21. The address information of each table in which the transfer information is set is obtained from the transfer information address table 21, and the transfer information is read from the policer information table 22, the application transfer information table 23, the in-system common transfer information table 24 and the output information table 25 based on that address information respectively.

The packet search table 2 delivers the transfer information read from each table to the search process circuit 1, and the search process circuit 1 outputs the transfer information to a packet transfer control division that is not shown, so that the inputted IP packet will be transferred according to that transfer information.

Figure 2:
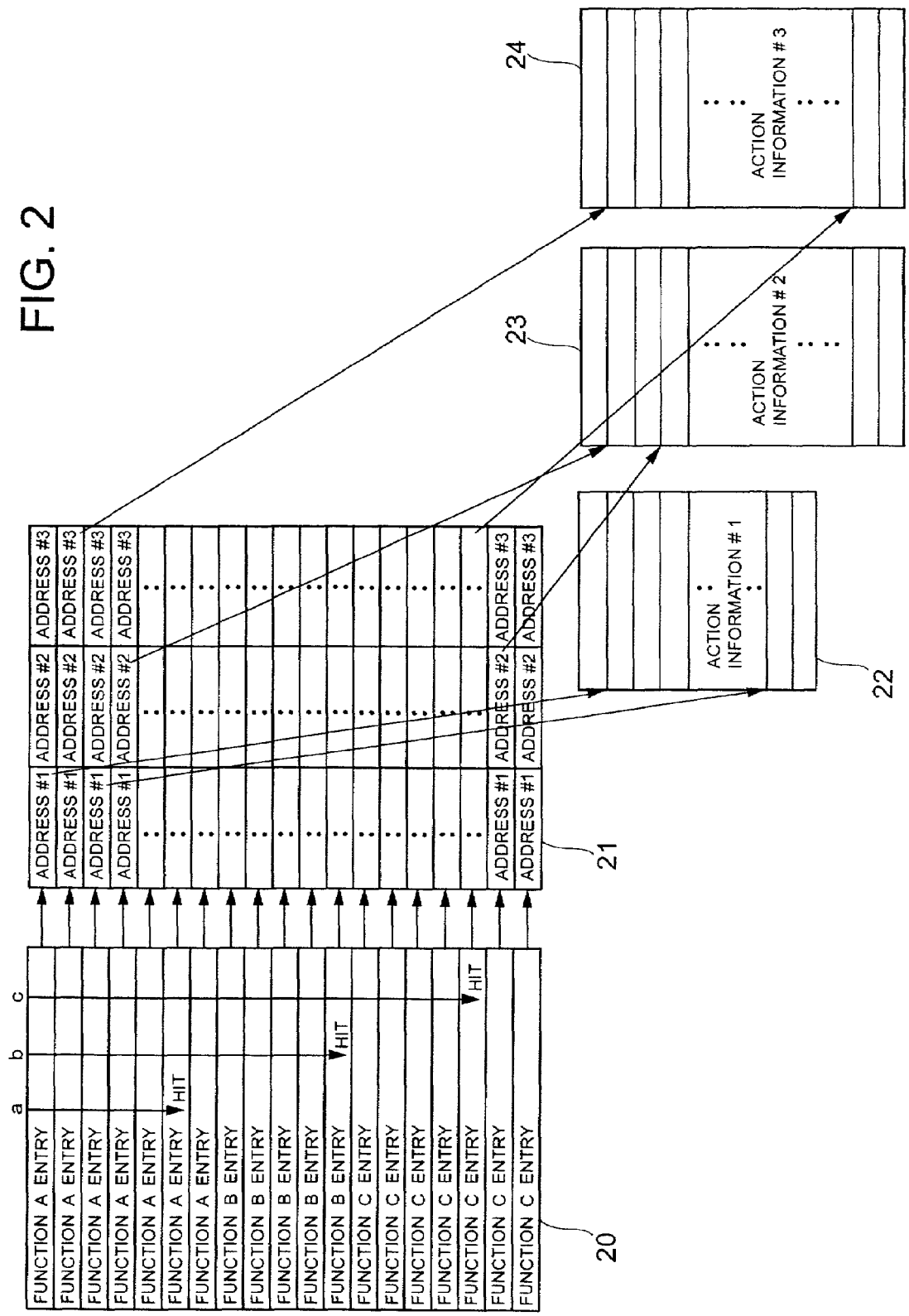
FIG. 2 is a conceptual rendering for showing a transfer information search process of the packet transfer apparatus according to the embodiment of the present invention.

FIG. 2 is a conceptual rendering for showing a transfer information search process of the packet transfer apparatus according to the embodiment of the present invention. In FIG. 2, the entries of functions A, B and C are registered with the CAM 20 of the packet search table 2, and if any of these entries is hit, it reads address information from the transfer information address table 21 corresponding to the hit entry.

According to this address information, action information #1 to #3 will be read from the policer information table 22, the application transfer information table 23 and the in-system common transfer information table 24 respectively. Moreover, illustration of the output information table 25 is omitted in FIG. 2.

Figure 3:
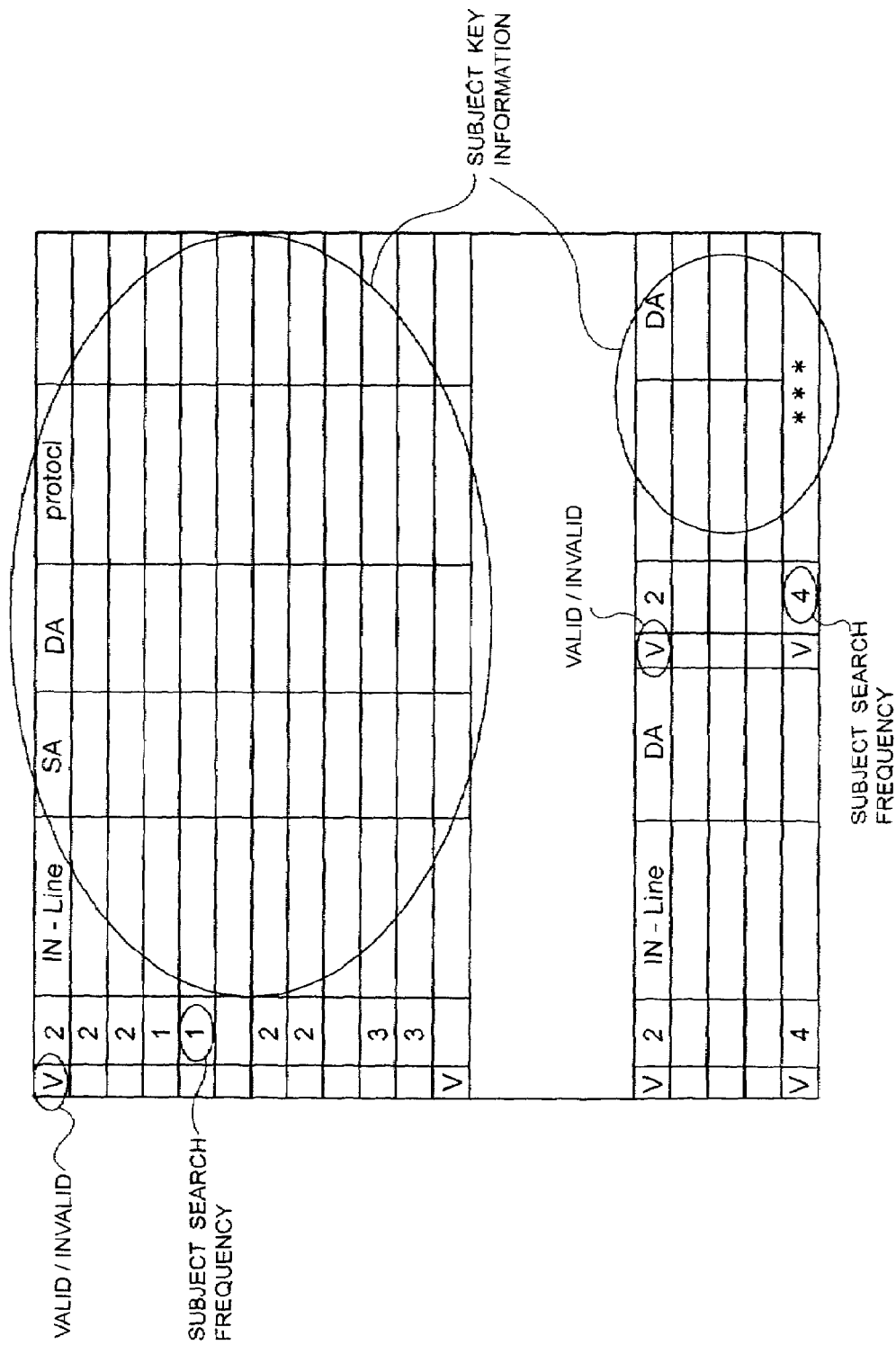
FIG. 3 is a diagram for showing a configuration of the packet search table in FIG. 1.

FIG. 3 is a diagram for showing a configuration of the packet search table 2 in FIG. 1. In FIG. 3, the packet search table 2 has at least a V (valid) bit showing valid/invalid, a subject search frequency and search key information (IN-Line, SA, DA, protocol and so on) registered.

Figure 4:
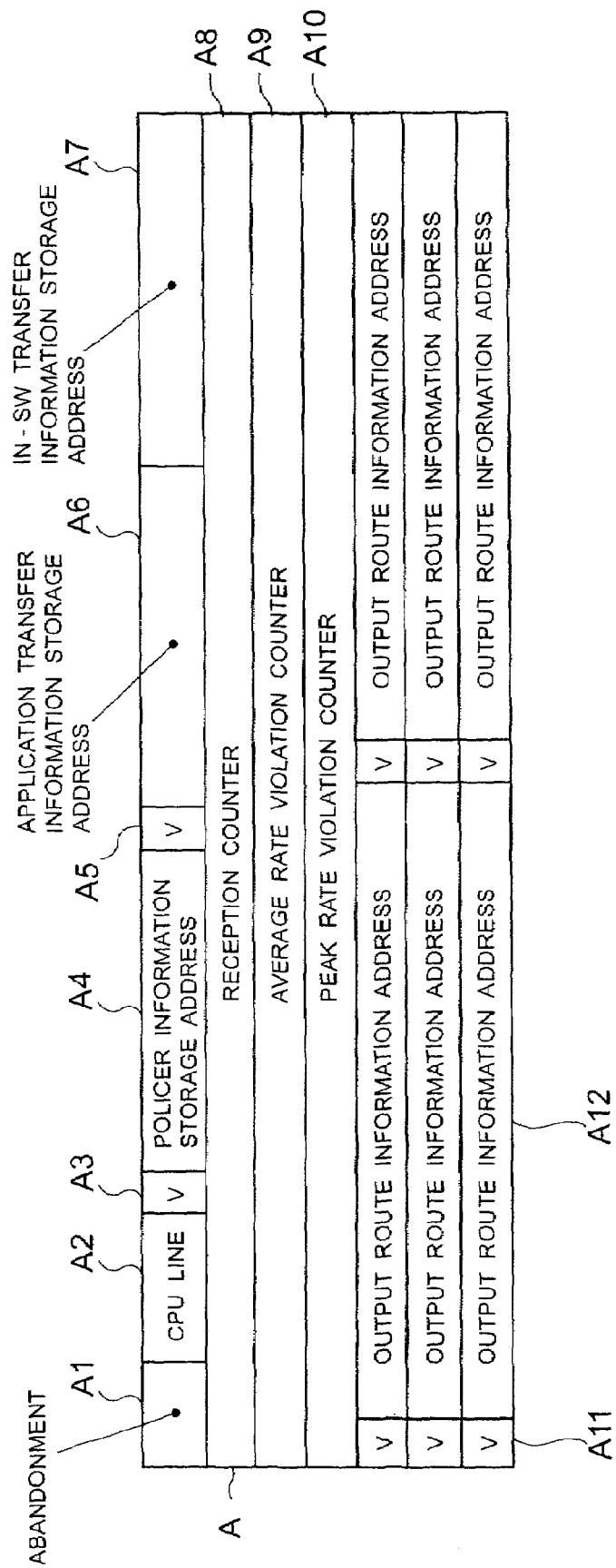
FIG. 4 is a diagram for showing a configuration of a transfer information address table in FIG. 1.

FIG. 4 is a diagram for showing a configuration of the transfer information address table 21. In FIG. 4, the transfer information address table 21 has a transfer information address A comprised at least of abandonment information A1, a CPU line A2, V bits A3, A5 and A11, a policer information storage address A4, application transfer information storage address A6, in-SW transfer information storage address A7, a reception counter A8, an average rate violation counter A9, a peak rate violation counter A10 and an output route information address A12 registered.

Figure 5:
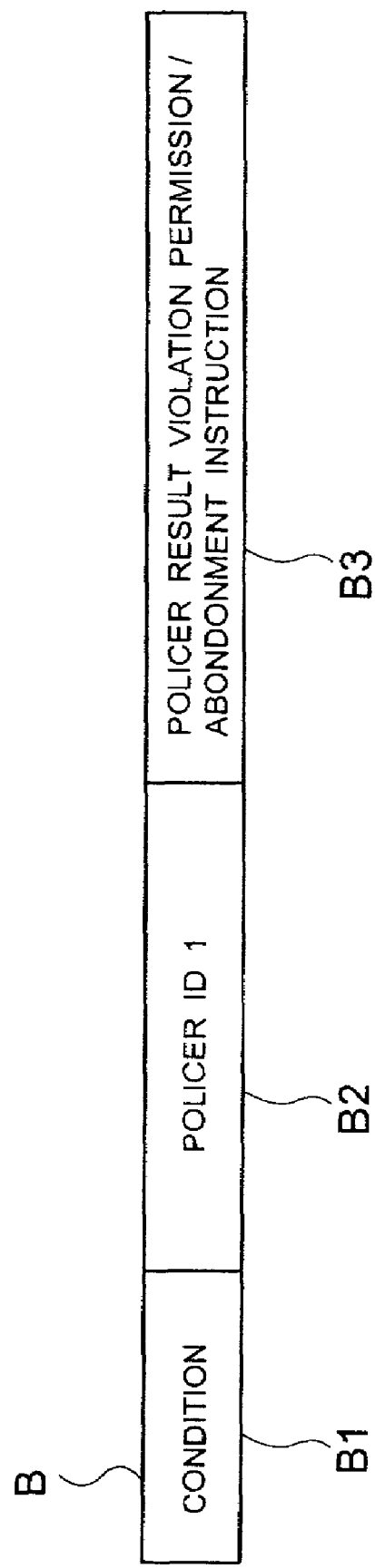
FIG. 5 is a diagram for showing a configuration of a policer information table in FIG. 1.

FIG. 5 is a diagram for showing a configuration of the policer information table 22 in FIG. 1. In FIG. 5, the policer information table 22 has policer information B comprised at least of a condition B1, a policer ID1 B2 and policer result violation permission/abandonment instruction B3 registered.

Figure 6:
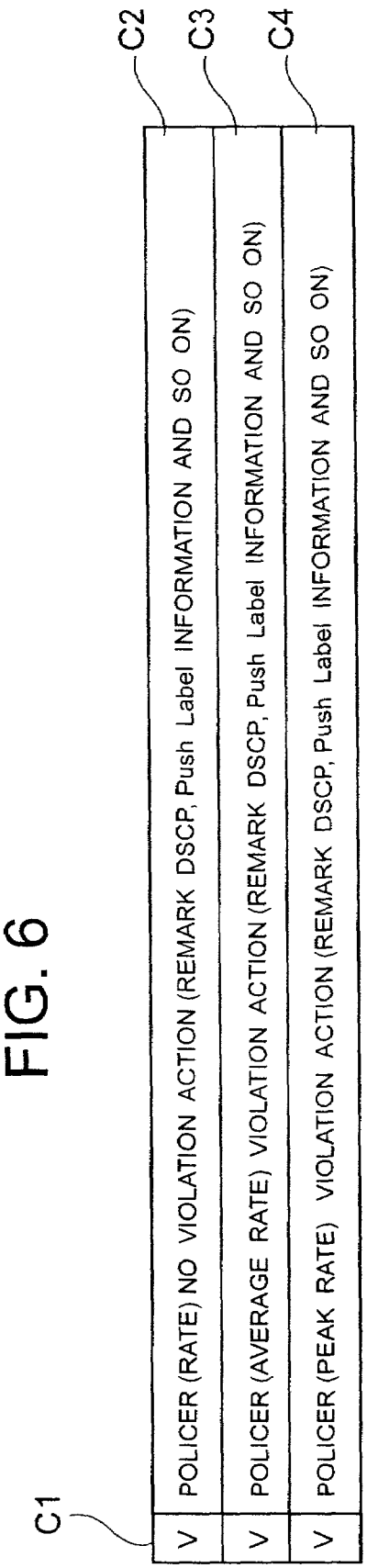
FIG. 6 is a diagram for showing a configuration of an application transfer information table in FIG. 1.

FIG. 6 is a diagram for showing a configuration of the application transfer information table 23 in FIG. 1. In FIG. 6, the application transfer information table 23 has application transfer information C comprised at least of V bit C1, policer (rate) no violation action (remark DSCP, push label information and so on) C2, policer (average rate) violation action (remark DSCP, push label information and so on) C3 and policer (peak rate) violation action (remark DSCP, push label information and so on) C4.

Figure 7:
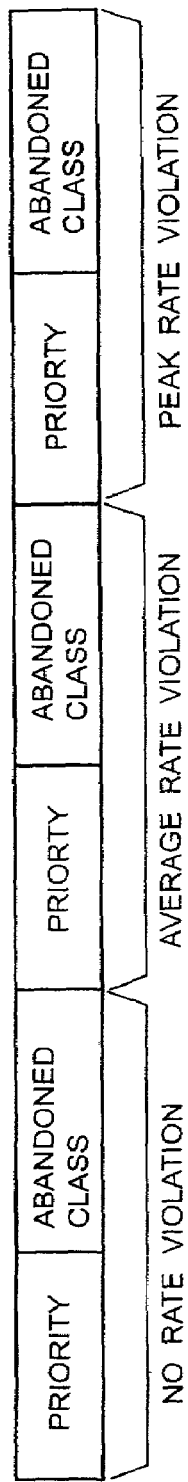
FIG. 7 is a diagram for showing a configuration of an in-system common transfer information table in FIG. 1.

FIG. 7 is a diagram for showing a configuration of the in-system common transfer information table 24 in FIG. 1. In FIG. 7, the in-system common transfer information table 24 has in-system common transfer information comprised of priority and an abandonment class of no rate violation but of average rate violation, and peak rate violation registered.

Figure 8:
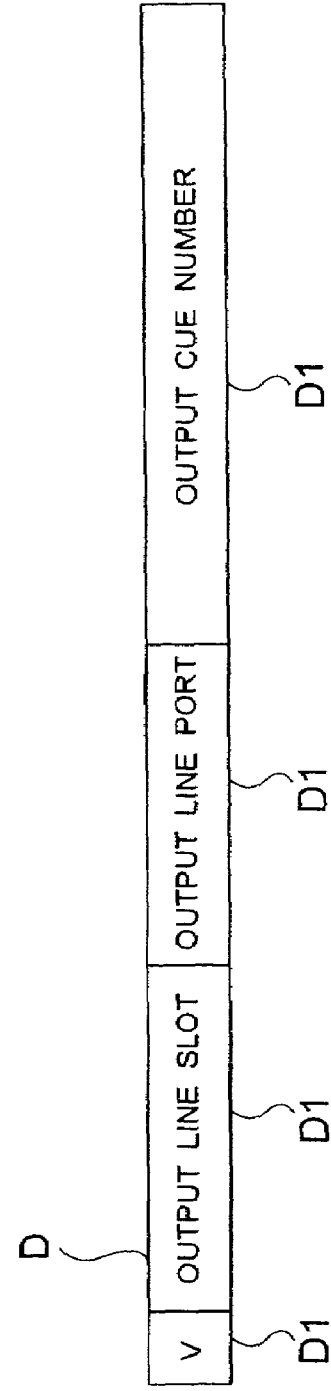
FIG. 8 is a diagram for showing a configuration of an output information table in FIG. 1.

FIG. 8 is a diagram for showing a configuration of the output information table 25 in FIG. 1. In FIG. 8, the output information table 25 has output information D comprised of a V bit D1, an output line slot D2, an output line port D3 and an output cue number D4 registered.

Figure 9:
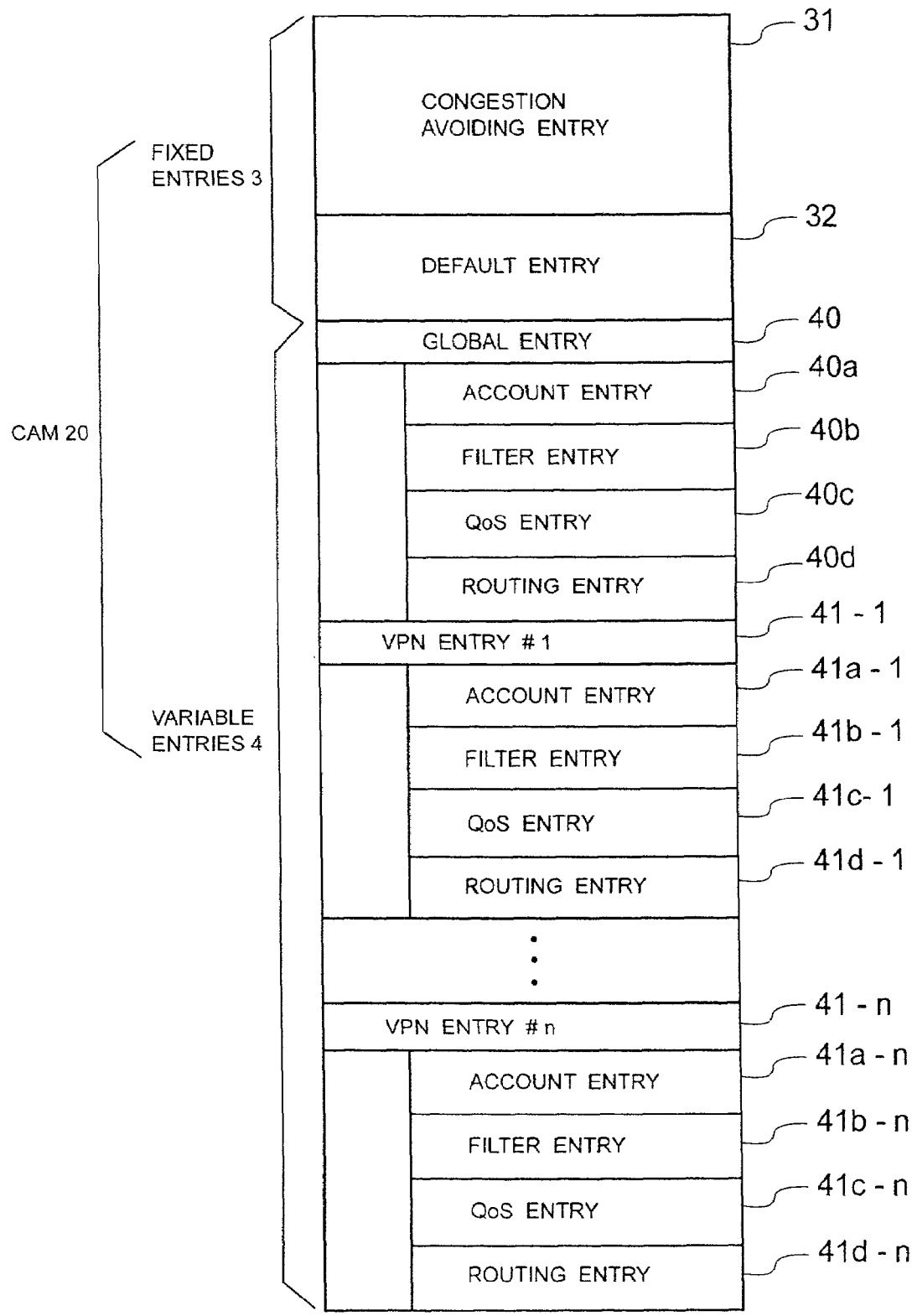
FIG. 9 is a diagram for showing a concrete example of a configuration of a CAM of a packet search table in FIG. 1.
Figure 10:
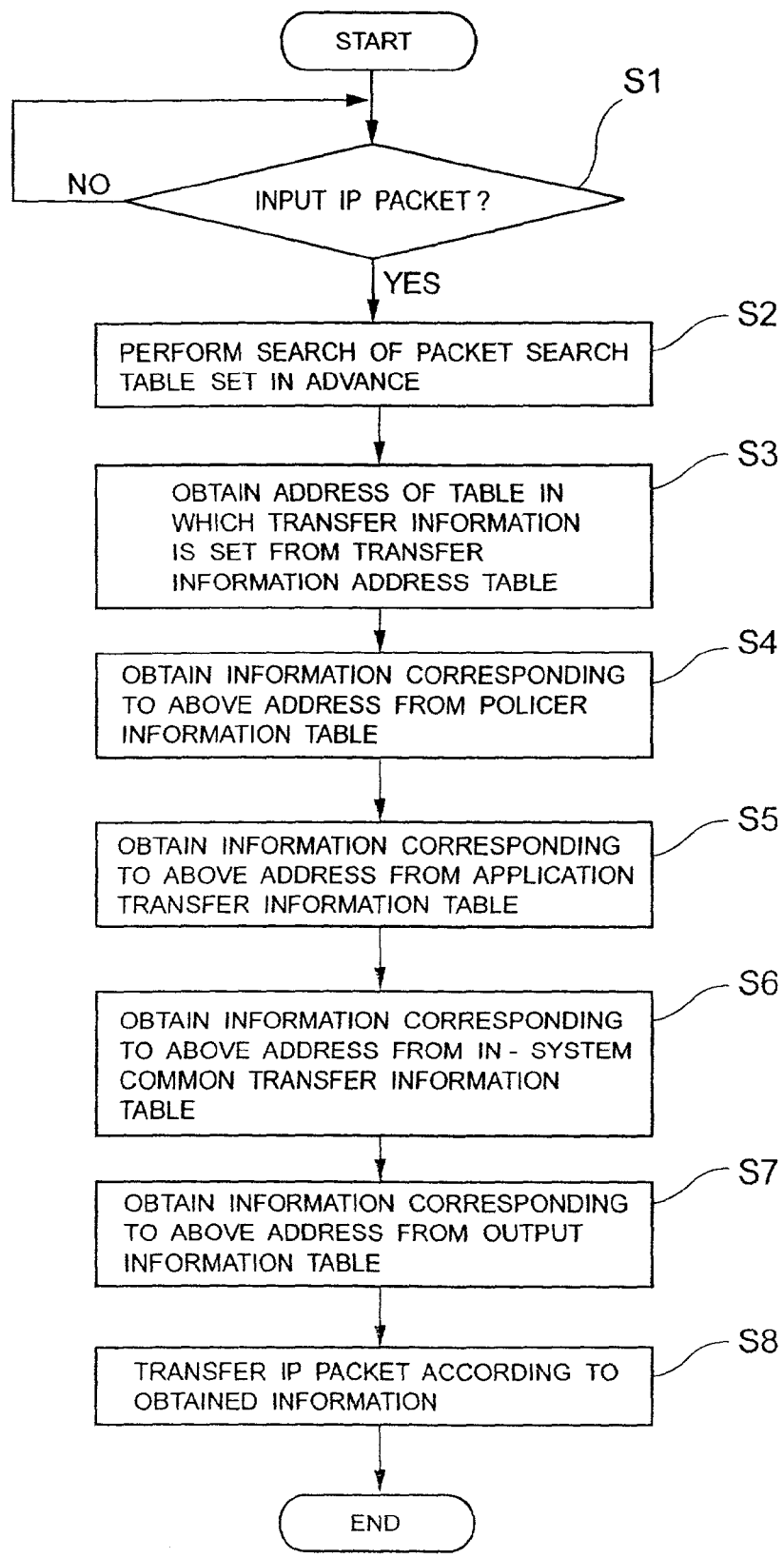
FIG. 10 is a flowchart for showing processing operation of a data transfer apparatus according to the embodiment of the present invention.

FIG. 9 is a diagram for showing a concrete example of a configuration of the CAM 20 of the packet search table 2 in FIG. 1, and FIG. 10 is a flowchart for showing processing operation of the data transfer apparatus according to the embodiment of the present invention, and FIGS. 11 to 15 are the flowcharts for showing processing operation of the search process circuit 1 in FIG. 1. The processing operation of the data transfer apparatus according to the embodiment of the present invention will be described by referring to FIGS. 1 to 15.

If an IP packet is inputted (step S1 in FIG. 10), the search process circuit 1 performs a search of the CAM 20 of the packet search table 2 that is set in advance (step S2 in FIG. 10). The search process circuit 1 obtains the transfer information address A of each table in which the transfer information is set from the transfer information address table 21 corresponding to the entry that is hit as the search results of the CAM 20 of the packet search table 2 (step S3 in FIG. 10).

The search process circuit 1 obtains the policer information B from the policer information table 22 (step S4 in FIG. 10) based on the obtained address, obtains the application transfer information C from the application transfer information table 23 (step S5 in FIG. 10), obtains the in-system common transfer information from the in-system common transfer information table 24 (step S6 in FIG. 10), and obtains the output information D from the output information table 25 (step S7 in FIG. 10) (see FIG. 2). The packet transfer control division transfers the IP packet according to these pieces of transfer information (step S8 in FIG. 10).

Next, a management method of the CAM 20 of the packet search table 2 will be described by referring to FIG. 9. In case of managing the CAM 20 of the packet search table 2, the entries to be set in the CAM 20 are divided into fixed entries 3 and variable entries 4.

The fixed entries 3 are literally the entries that are fixedly set on initialization of a system, and their entry types include a congestion avoiding entry 31 that is hit on congestion according to the congestion level and a default entry 32 that is hit by the packet having no match as a result of the search.

The variable entries 4 means the entries that are set or deleted by the maintainer during the operation or the entries that are dynamically set or deleted by a routing protocol and so on. While the variable entries 4 are divided into global entries 40 and VPN (Virtual Private Network) entries (#1 to #n) 41-1 to 41-n, no particular attention is paid to that division since it is included in the search key information.

As for the entry types in common with the global entries 40 and the VPN entries 41-1 to 41-n, there are four types, that is, account entries 40a, 41a-1 to 41a-n, filter entries 40b, 41b-1 to 41b-n, QoS (Quality of Service) entries 40c, 41c-1 to 41c-n, and routing entries 40d, 41d-1 to 41d-n.

Subsequently, the usage of the packet search table 2 will be described. In case of using the packet search table 2, the search process of four times per packet is performed on the search process circuit 1 for the CAM 20 of the packet search table 2 that is set in advance in the above manner. Search logic on the search process circuit 1 is in common with each search process, where the entry that is hit first is adopted. Moreover, the search process frequency by the search process circuit 1 is variable according to the set number of entries. To be more specific, the search process frequency increases or decreases according to increase or decrease in the set number of entries.

Figure 11:
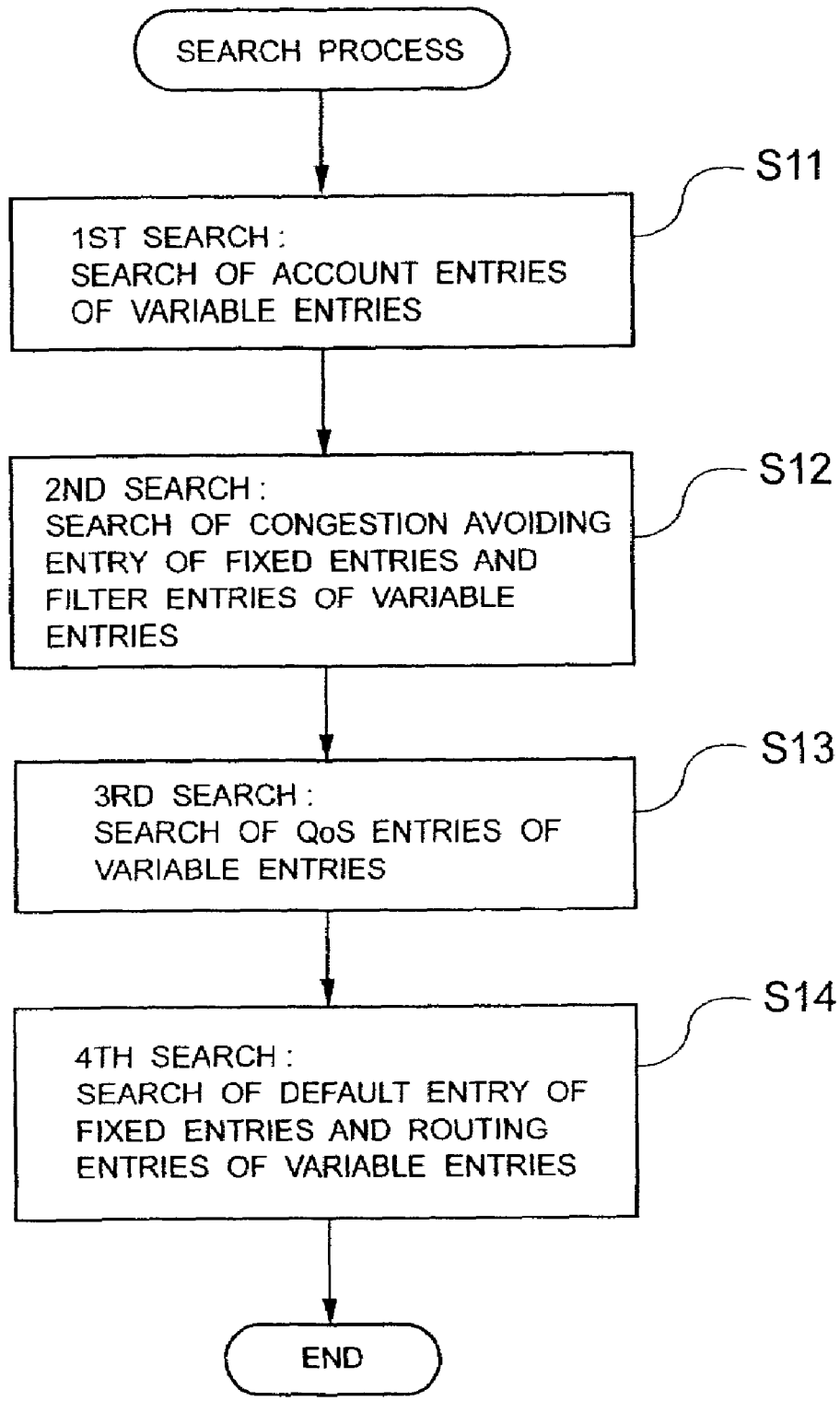
FIG. 11 is a flowchart for showing processing operation of a search process circuit 1 in FIG. 1.
Figure 12:
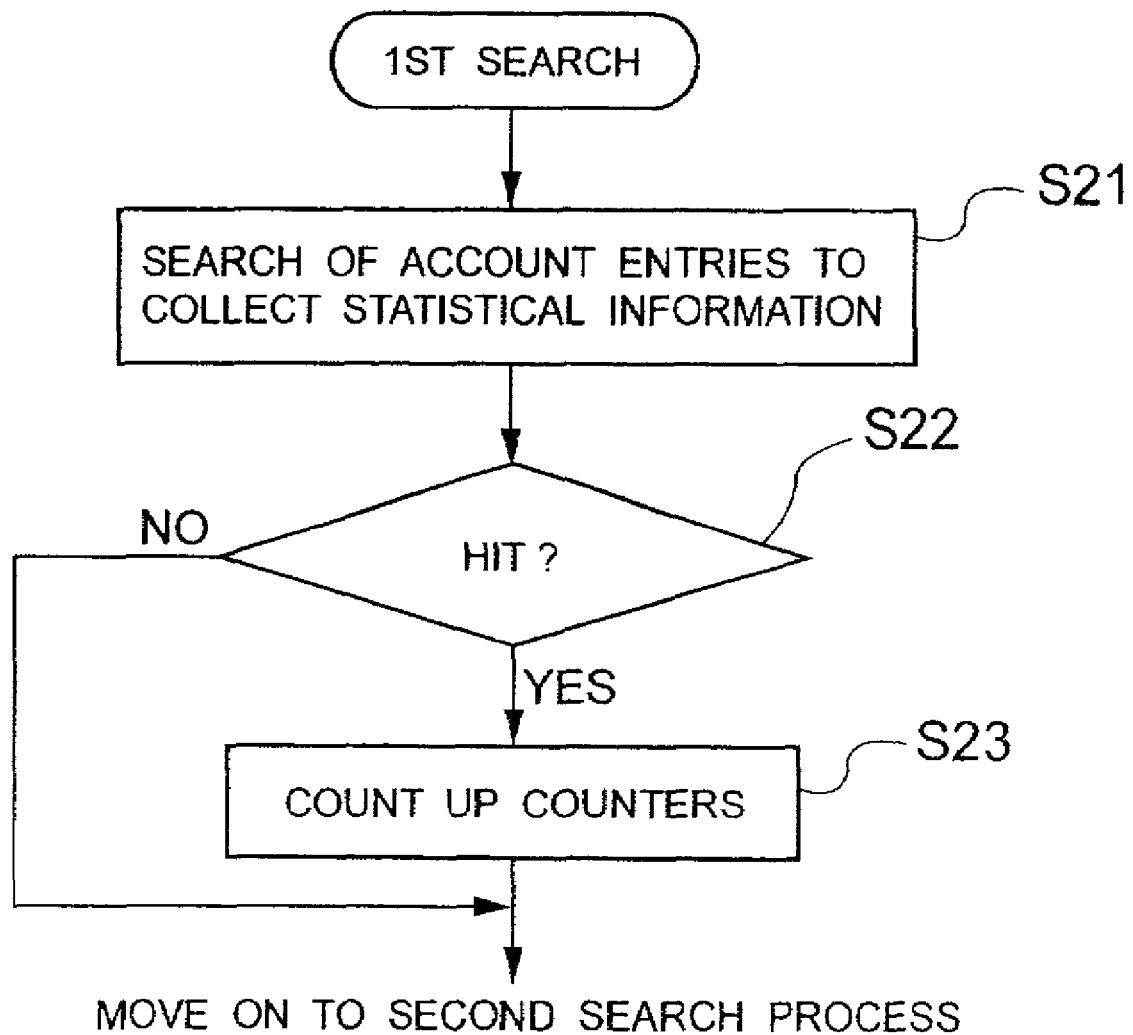
FIG. 12 is a flowchart for showing the processing operation of the search process circuit 1 in FIG. 1.

The search process circuit 1 performs a search of the account entries 40a, 41a-1 to 41a-n of the variable entries 4 as a first search (step S11 in FIG. 11), and performs a search of the congestion avoiding entry 31 of the fixed entries 3 and the filter entries 40b, 41b-1 to 41b-n of the variable entries 4 as a second search (step S12 in FIG. 11).

In addition, the search process circuit 1 performs a search of the QoS entries 40c, 41c-1 to 41c-n of the variable entries 4 as a third search (step S13 in FIG. 11), and performs a search of the default entry 32 of the fixed entries 3 and the routing entries 40d, 41d-1 to 41d-n of the variable entries 4 as a fourth search (step S14 in FIG. 11).

The search by the search process circuit 1 will be described further in detail. It performs a search of the received IP packet for the account entries 40a, 41a-1 to 41a-n in order to collect the statistical information in the first search (step S21 in FIG. 12). As the account entries 40a, 41a-1 to 41a-n are the entries intended to have the statistical information consciously collected by the user, the process on hitting is only counting up the counters (step S22 and S23 in FIG. 12).

If setting of the account entries 40a, 41a-1 to 41a-n is not performed, it becomes a mishit (step S22 in FIG. 12), and the process moves on to the second search. As a point to keep in mind in this case, the process of counting the number of the packets is executed in all the four searches. Then, the reason for performing the search process only of packet collection in the first search is that the search processes of the second time and thereafter are intended for admission control or a particular transfer process of the packets, where the counting of the number of the packets is performed accompanying it.

To be more specific, it is because, when the user wants to collect the number of the packets not dependent on the transfer process, the packets must be processed as ones uncertain about how they are transferred in case of hitting the entry for packet collection in the same search process as an ordinary packet transfer determination process.

Figure 13:
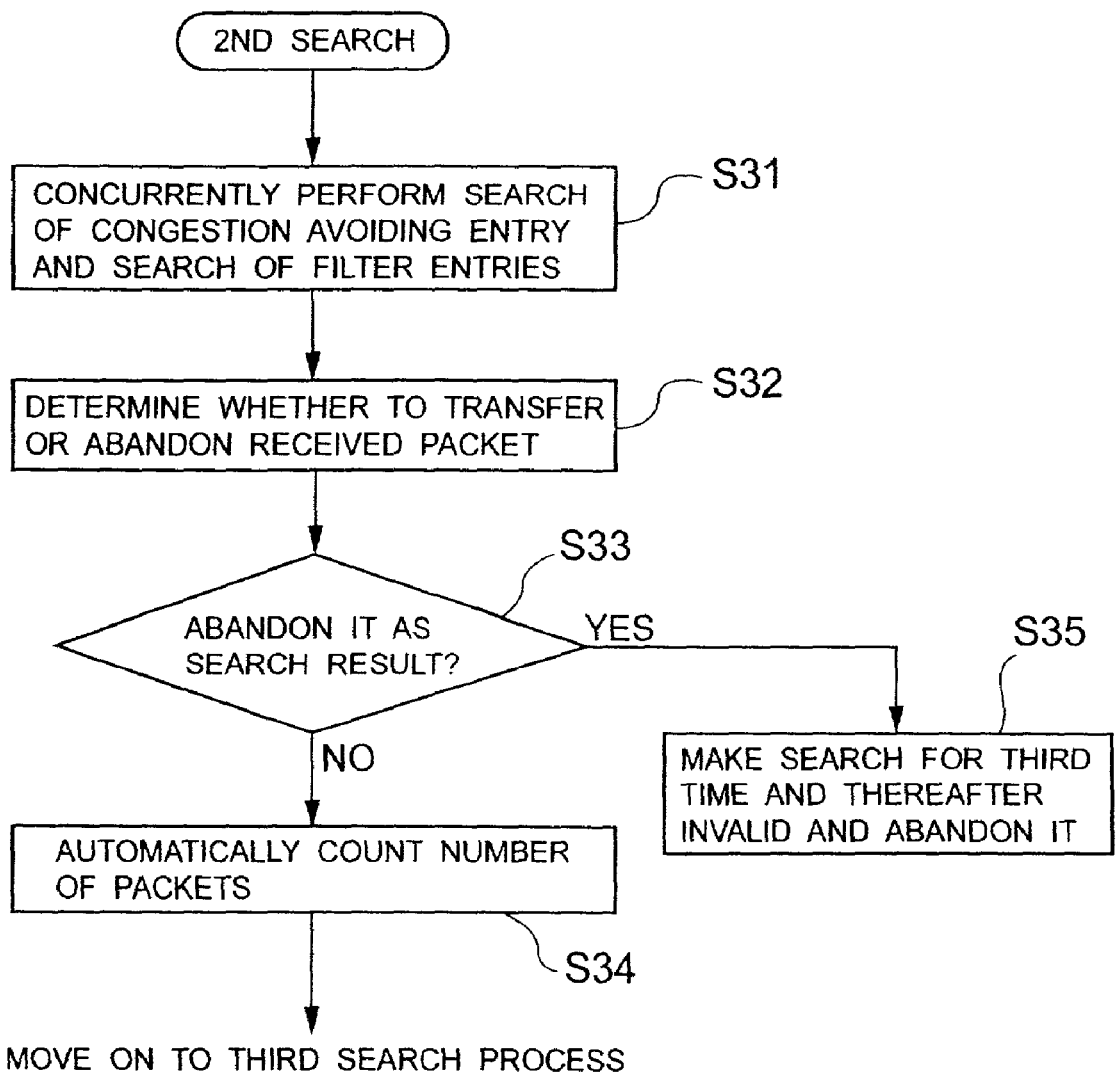
FIG. 13 is a flowchart for showing the processing operation of the search process circuit 1 in FIG. 1.

The search process circuit 1 concurrently performs a search of the congestion avoiding entry 31 and a search of the filter entries 40b, 41b-1 to 41b-n (step S31 in FIG. 13). In this second search, it is determined whether to transfer or abandon the packet received by the admission control based on the above search results (step S32 in FIG. 13).

As the congestion avoiding entry 31 has a higher priority than the filter entries 40b, 41b-1 to 41b-n, they are set area-wise in lowering order of the congestion avoiding entry 31, the filter entries 40b, 41b-1 to 4b-n. In addition, although the congestion avoiding entry 31 is set in normal (uncongested) times, it is rendered "invalid" and is not to be searched for, and so only a search of the filter entries 40b, 41b-1 to 41b-n is performed. On the congestion, the entries corresponding to the congestion level are set to be "valid," and the congestion avoiding entry 31 is also searched for.

In the case where it is abandoned as a result of the search (step S33 in FIG. 13), the searchs for the third time and thereafter become invalid and are abandoned (step S35 in FIG. 13). And in the case where the transfer is permitted (step S33 in FIG. 13), the packet is transferred according to the search results of the third time and thereafter. In this case, any packet hitting the entry is automatically counted as the number of the packets (step S34 in FIG. 13).

Figure 14:
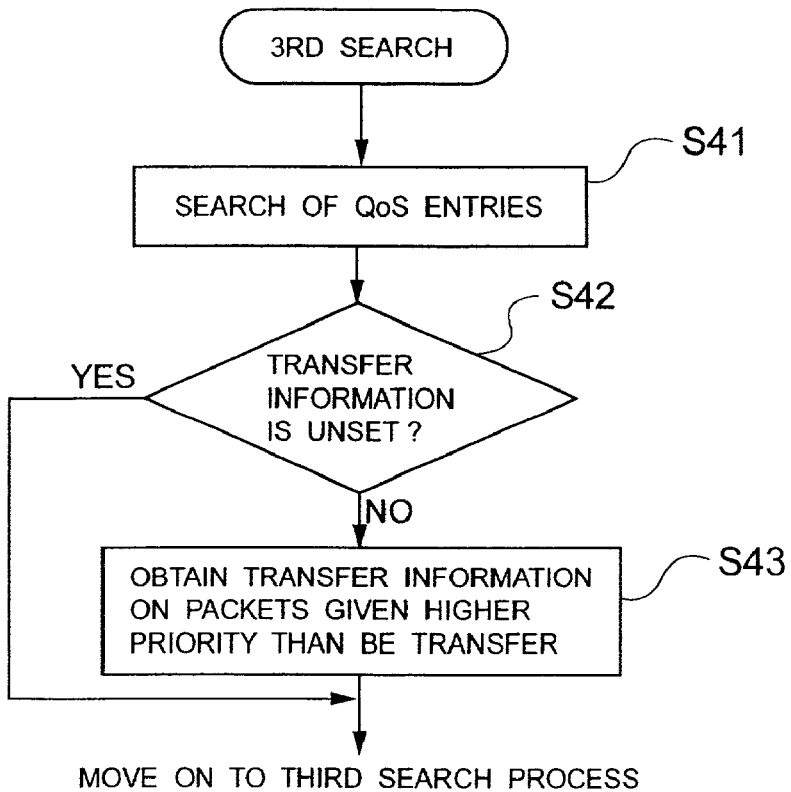
FIG. 14 is a flowchart for showing the processing operation of the search process circuit 1 in FIG. 1.

The search process circuit 1 performs a search of the QoS entries 40c, 41c-1 to 41c-n in the third search (step S41 to S43 in FIG. 14), and obtains the transfer information on the packets given a higher priority than the BE (Best Effort) transfer (step S42 and S43 in FIG. 14).

The transfer information includes the above-mentioned policer information B, application transfer information C, in-system common transfer information and output information D, and in the case where the transfer information is unset (invalid), the transfer information determined by the fourth routing entries 40d, 41d-1 to 41d-n is adopted.

Figure 15:
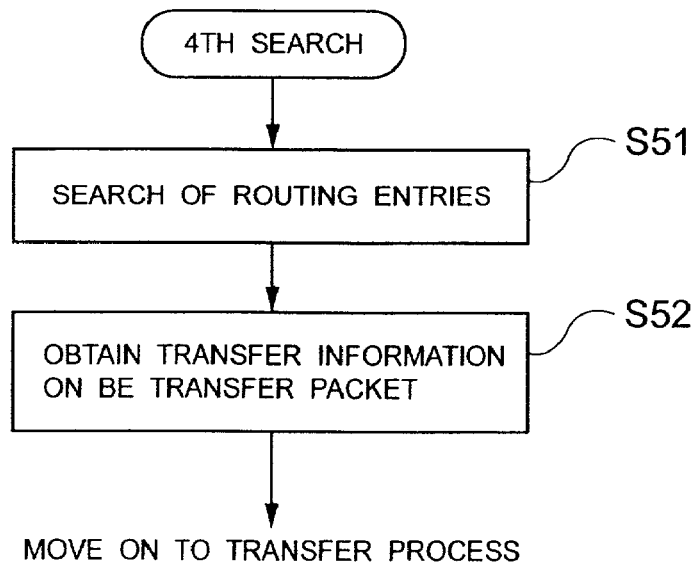
FIG. 15 is a flowchart for showing the processing operation of the search process circuit 1 in FIG. 1.
Figure 16:
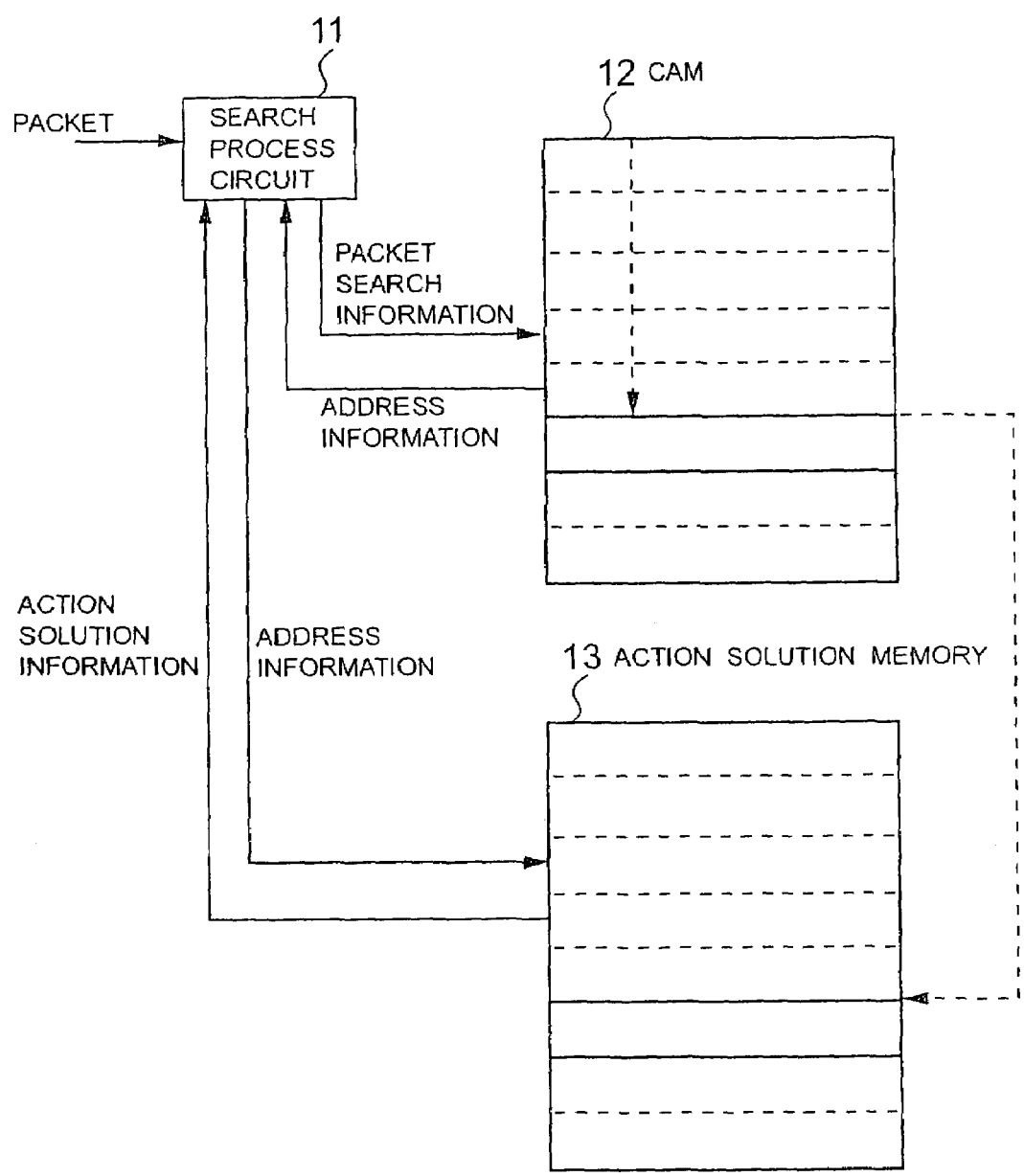
FIG. 16 is a block diagram for showing the configuration of the transfer information search division of the packet transfer apparatus according to a past example.
Figure 17A:
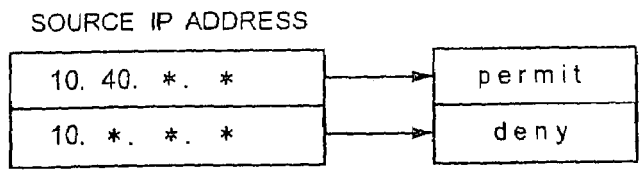
FIGS. 17A to 17E are diagrams for showing problems of transfer information search of the packet transfer apparatus according to the past example.
Figure 17B:
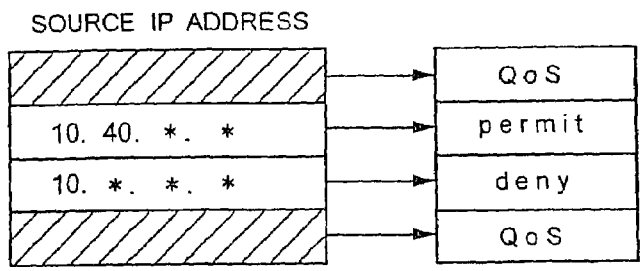
Figure 17C:
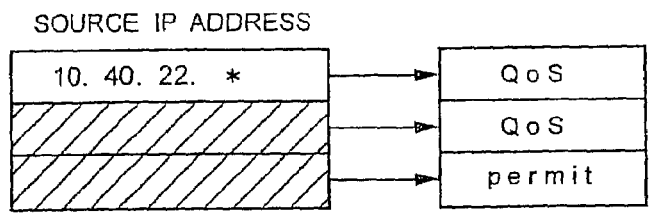
Figure 17D:
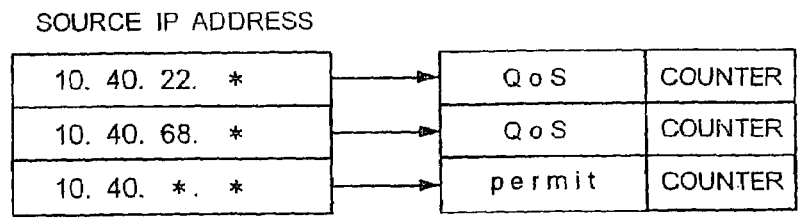
Figure 17E:
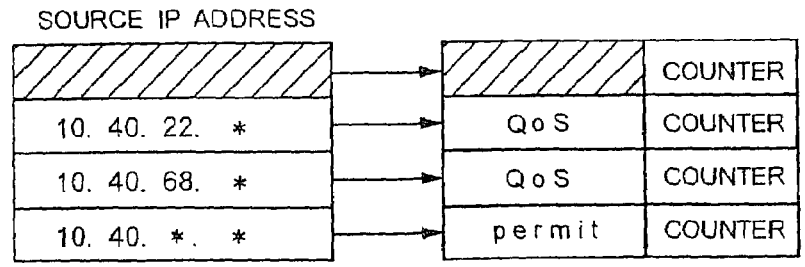

The search process circuit 1 performs a search of the routing entries 40d, 41d-1 to 41d-n in the fourth search (step S51 in FIG. 15), and obtains the transfer information on the BE transfer packet (step S52 in FIG. 15).

In this case, the same transfer information as that of the third search of the QoS entries 40c, 41c-1 to 41c-n is obtained, and the information obtained in the third search is given a priority. As the transfer information setting is finally determined in transfer operation by this search, all except the policer information B is essential. Moreover, when making a search of the account entries 40a, 41a-1 to 41a-n, the filter entries 40b, 41b-1 to 41b-n, the QoS entries 40c, 41c-1 to 41c-n, and the routing entries 40d, 41d-1 to 41d-n of the variable entries 4, a search of the VPN entries 41-1 to 41-n is performed by specifying the VPN entries 41-1 to 41-n based on the information specifying one of the VPN entries 41-1 to 41-n added to the search key information.

Thus, the competition problem among the entries can be avoided by providing the search entries wherein the received packets are classified into a plurality of types and performing the search process independently by the functions, so that it becomes possible to reduce entry management costs of the maintainer and improve throughput by omitting a competition check among the entries in an entry setting process.

In case of dividing the above search process by the functions, "extraction of the functions" must be performed as a precondition. As this is different depending on implementation of the system, this embodiment largely classifies the functions into a "packet account," a "packet filter" and a "QoS assurance flow search."

As for the packet account, the information as the search result does not exist, and it only counts up the counters. As for the packet filter, it determines whether the packet is acceptable or unacceptable as the search results, and it is forcedly abandoned if unacceptable. As for the QoS assurance flow search, the information on the QoS transfer such as a subject policing solution, a transfer priorities, abandonment priorities and so on can be obtained as the search results.

An independent search per function is performed in the above search process, and its search order does not matter basically. In addition, all the search results can be independently obtained by independently performing these searches. There are pieces of information not holding concurrently obtained from the plurality of functions, which can be solved by giving priorities to the information in advance. In the above example, in the case where the search results that it is unacceptable is obtained from the packet filter and the information on transfer priorities and so on is obtained in the "QoS assurance flow search," the applicable flow is determined to be "unacceptable" so that the results such as the transfer priorities and so on are ignored.

On the other hand, entry competition means that an entry A of a certain function is related to the contents (specifically, contents of the search key) of an entry B of another function and one search hits only one entry so that any one of the entries is not hit and its function becomes invalid. If the entries A and B are completely independent, this problem of the entry competition does not arise as a result of the search on arrival of the packet since it will not match with both.

However, there is a possibility that the packet having arrived will match both the entries A and B in the case where the entries A and B are related (such as when one of them is including the other). In this case, as one search hits only one of them, the other entry and its search results become invalid.

As opposed to this, in case of obtaining the search results of each function, it can be solved by hitting both entries A and B, not depending on the relation between them. That is, as one search hits one entry, the applicable entry of each function is hit and the search results thereof can be obtained by performing the search per function so that the above problem of the competition between the entries is solved.

In addition, as a result of dividing the transfer information obtained as the search results by the objectives, it is possible, at the time of changing the application, to provide it with minimum necessary change in changing a transfer process determination table by making no change to an application-independent portion (system common portion).

Furthermore, as it is possible, by sharing the transfer information obtained as the search results by indirect referencing, to handle the update of the transfer information by updating one table, the throughput is improved. Furthermore, it leads to improvement in reliability of the network if considered in collaboration with an alternative function.

In this case, if attention is paid to an "output line number" in the information obtained as the search results, it is possible, in the case where the line of the line number #1 cannot be used due to a wire obstacle and so on and if line information is shared by address reference, to make the wire obstacle known to all the entries referring to the line information by updating only the sharing table of that line information.

As opposed to this, in the case of a system of directly obtaining the "output line number" without sharing the information, it is necessary to update the search results for all the applicable entries using the line number #1. It is difficult to simply determine selection of this information to be shared here since it depends on implementation of the system, at least sharing the above "output line number" and so on will lead to reduction of memory and improvement in search results updating ability.

Moreover, while the transfer of the IP packet is mentioned in this embodiment, it is applicable to transfer of any packet other than the IP packet by setting layer 2 information, MPLS (Multi-Protocol Label Switching) label information and so on the search key. In case of providing the VPN by MPLS, it is necessary to perform a search by including also the second label in the search key.

As described above, according to the present invention, the data transfer apparatus for transferring the packet based on the transfer information corresponding to one of a plurality of entries set in the packet search table in advance has a plurality of the registration tables for having the transfer information registered by objectives, the address table for having the address of each of the plurality of registration tables registered, and obtains the transfer information on each of the plurality of registration tables based on the address obtained from the address table corresponding to the matching entry of the above described plurality of entries so as to have the effects of avoiding the competition problem among the entries, reducing the entry management costs and improving the entry setting processing ability.

What is claimed is:

1. A data transfer apparatus for transferring a packet based on transfer information corresponding to one of a plurality of entries set in a packet search table in advance, comprising:

a packet search table (2) receiving a packet search information for a packet to be transferred, the packet search table comprising a plurality of registration tables (22, 23, 24, 25) storing said transfer information set in advance and registered by objectives;

a search means (20) to search for the transfer information, from the registration tables, based on the received packet search information;

a transfer information address table (21) having address information registration positions of each of said plurality of registration tables, the registration positions indicating address information where said transfer information is stored by said registration tables, the address information being output by the transfer information address table to the registration tables to obtain transfer information corresponding to the packet search information received by the search means, the registration tables outputting the obtained transfer information for transferring the packet; and a search process circuit (1) that receives the packet to be transferred and issues the packet search information to the packet search table, wherein, the search means receives the issued packet search information and comprises a content-addressable memory (20) with stored search pattern entries that satisfy different packet search information so a received packet search information hits a satisfying search pattern entry, the search pattern entries having been stored prior to receipt of the packet search information, the transfer information address table (21), receives input from the content addressable memory (20), the information registration positions corresponding to the search pattern entries so the hit search pattern entry selects a corresponding registration position, the corresponding registration position indicating a corresponding address information where said transfer information is stored by said registration tables, the corresponding address information being output by the transfer information address table to the registration tables to obtain the transfer information corresponding to the received packet search information, and the registration tables connected to output the obtained transfer information to the search process circuit, wherein said plurality of entries are classified into a plurality of types, and wherein, the registration tables comprise a policer information table (22), an application transfer information table (23), an in-system common transfer information table (24) and an output information table (25).

2. The data transfer apparatus according to claim 1, wherein said plurality of entries are classified into a plurality of types, and wherein said plurality of entries are classified at least into fixed entries that are fixedly set on initialization of a system and variable entries that are comprised of either the entries to be set or deleted during operation of said system or the entries to be dynamically set or deleted by a routing protocol.

3. The data transfer apparatus according to claim 1, wherein said plurality of entries are classified into a plurality of types, and further comprising search entries wherein said plurality of entries are classified into said plurality of types so as to execute a search process for said search entries independently by functions.

4. The data transfer apparatus according to claim 3, wherein said search means has its functions classified, to be performed independently, into a packet account only for counting up counters used for collecting of packet statistical information, a packet filter used for determining whether the packet is acceptable or unacceptable, and a QoS assurance flow search for obtaining information on QoS (Quality of Service) transfer.

5. The data transfer apparatus according to claim 1, wherein said plurality of entries are classified into a plurality of types, and wherein transfer information obtained as a result of a search of said search means is divided by objectives.

6. The data transfer apparatus according to claim 1, wherein said search means executes a search process on receipt of said packet a plurality of times.

7. The data transfer apparatus according to claim 6, wherein said search means executes the search process on receipt of said packet according to the set number of said plurality of entries.

8. The data transfer apparatus according to claim 1, wherein the transfer information obtained as a result of a search of said search means is shared by indirect referencing by said address.

9. A transfer information management method of a data transfer apparatus for transferring a packet based on transfer information corresponding to one of a plurality of entries set in a packet search table in advance, wherein management is conducted by:

registering function entries (A, B, C) in a function table (20);

registering address information (#1, #2, #3) in a transfer information address table (21) with each registered function entry in the function table linked to a registered address information in the address table so that when any function entry is hit during a packet search, a corresponding address information from the address table is read; and registering said transfer information in a plurality of registration tables (22, 23, 24) by objectives, wherein, the registering of the address of each of said plurality of registration tables in the address table links the transfer information stored on each of said plurality of registration tables based on the address of said address table corresponding to a matching entry of said plurality of entries, the registration tables comprise a policer information table (22), an application transfer information table (23), an in-system common transfer information table (24) and an output information table (25), sending a packet search information, based on information found in a packet to be forwarded to a destination, to the function table and forwarding the packet to the destination based on the transfer information received as a result of the sent packet search information.

10. The transfer information management method according to claim 9, wherein, said function table is a content-addressable memory, and said plurality of entries are managed by classifying them into a plurality of types.

11. The transfer information management method according to claim 10, wherein said plurality of entries are classified at least into fixed entries that are fixedly set on initialization of a system and variable entries that are comprised of either the entries to be set or deleted during operation of said system or the entries to be dynamically set or deleted by a routing protocol.

12. The transfer information management method according to claim 10, wherein transfer information obtained as a result of a search is managed by dividing it by objectives.

13. The transfer information management method according to claim 9, wherein the transfer information obtained as a result of a search is managed by sharing it by indirect referencing by said address.

14. A transfer information search method of a data transfer apparatus for transferring a packet based on transfer information corresponding to one of a plurality of entries set in a packet search table in advance, comprising the steps of:

in advance, creating a function table set with a plurality of search pattern entries, registration tables with transfer information registered by objectives, and a transfer information address table set with address information of the transfer information that corresponds to the search pattern entries;

sending a input packet search information, based on information found in a packet to be forwarded to a destination, to the function table;

searching the function table for an entry, from said plurality of entries, matching the input packet search information;

obtaining an address corresponding to the matching entry of said plurality of entries from the address table;

obtaining the transfer information on each of said plurality of registration tables based on the obtained address; and forwarding the packet to the destination based on the obtained transfer information, wherein, the registration tables comprise a policer information table (22), an application transfer information table (23), an insystem common transfer information table (24) and an output information table (25).

15. The transfer information search method according to claim 14, wherein, said function table is a content-addressable memory, and
said plurality of entries are classified into a plurality of types.

16. The transfer information search method according to claim 15, wherein said plurality of entries are classified at least into fixed entries that are fixedly set on initialization of a system and variable entries that are comprised of either the entries to be set or deleted during operation of said system or the entries to be dynamically set or deleted by a routing protocol.

17. The transfer information search method according to claim 15, wherein transfer information obtained in said step of obtaining the transfer information is divided by objectives.

18. The transfer information search method according to claim 14, wherein the search process on receipt of said packet is executed a plurality of times in said step of obtaining the address corresponding to the entry.

19. The transfer information search method according to claim 18, wherein the search process on receipt of said packet is executed according to the set number of said plurality of entries in said step of obtaining the address corresponding to the entry.

20. The transfer information search method according to claim 18, wherein a search process is executed independently, divided by functions in said step of obtaining the transfer information.

21. The transfer information search method according to claim 20, further comprising search entries wherein said plurality of entries are classified into said plurality of types so as to execute a search process for said search entries independently, divided by functions.

22. The transfer information search method according to claim 21, wherein, in said step of obtaining the address corresponding to the entry, said search process has its functions classified, to be performed independently, into a packet account only for counting up counters used for collecting packet statistical information, a packet filter used for determining whether the packet is acceptable or unacceptable, and a QoS assurance flow search for obtaining information on QoS (Quality of Service) transfer.

23. The transfer information search method according to claim 14, wherein the transfer information obtained in said step of obtaining the transfer information is shared by indirect referencing by said address.

* * * * *